United States Patent [19]
Yokobayashi

[11] Patent Number: 5,507,998
[45] Date of Patent: Apr. 16, 1996

[54] METHOD OF MANUFACTURING A PLASTIC CAN BODY BY INJECTION MOLDING A PREFORM FOLLOWED BY A BLOW MOLDING PROCESS

[75] Inventor: Kazuyuki Yokobayashi, Ueda, Japan

[73] Assignee: Nissei ASB Machine Co., Ltd., Nagano, Japan

[21] Appl. No.: 294,394

[22] Filed: Aug. 23, 1994

Related U.S. Application Data

[62] Division of Ser. No. 780,351, Oct. 22, 1991, Pat. No. 5,342,663.

[30] Foreign Application Priority Data

Oct. 26, 1990 [JP] Japan .................................. 2-289420

[51] Int. Cl.⁶ .................................................. B29C 49/06
[52] U.S. Cl. .................. 264/532; 264/537; 264/328.12; 425/533; 425/577; 428/36.92; 428/542.8
[58] Field of Search ................................... 264/532, 537, 264/538, 318, 523, 533, 328.12; 425/525, 533, 526, 529, 577; 428/542.8, 36.92

[56] References Cited

U.S. PATENT DOCUMENTS

| 3,470,282 | 9/1969 | Scalora | 264/532 |
|---|---|---|---|
| 3,978,232 | 8/1976 | Dodsworth et al. | 426/115 |
| 4,288,478 | 9/1981 | Kinoshita et al. | 428/542.8 |
| 4,305,902 | 12/1981 | Uhlig | 264/328.12 |
| 4,473,515 | 9/1984 | Ryder | 264/532 |
| 4,496,064 | 1/1985 | Beck et al. | 215/1 C |
| 4,615,667 | 10/1986 | Roy | 264/532 |
| 4,648,824 | 3/1987 | Aoki | 264/538 |
| 5,340,304 | 8/1994 | Nakamura | 425/577 |

FOREIGN PATENT DOCUMENTS

| 0140719 | 5/1985 | European Pat. Off. . |
| 0228324 | 7/1987 | European Pat. Off. . |
| 1108895 | 6/1961 | Germany . |
| 58-501991 | 11/1983 | Japan . |
| 60-25734 | 2/1985 | Japan . |
| 60-72720 | 4/1985 | Japan . |
| 83/01766 | 5/1983 | WIPO . |
| 8301766 | 5/1983 | WIPO . |

*Primary Examiner*—Catherine Timm
*Attorney, Agent, or Firm*—Oliff & Berridge

[57] ABSTRACT

A method of manufacturing a can body includes injection molding a preform including forming a bottom wall, a side wall, a curved shoulder and a flange extending outwardly from the shoulder. After molding, the preform is subjected to a stretch blow molding process to form the can body.

10 Claims, 4 Drawing Sheets

METHOD OF MANUFACTURING A PLASTIC CAN BODY BY INJECTION MOLDING A PREFORM FOLLOWED BY A BLOW MOLDING PROCESS

This is a Division of application Ser. No. 07/780,351 filed Oct. 22, 1991, now U.S. Pat. No. 5,342,663, issued Aug. 30, 1994.

BACKGROUND OF THE INVENTION

1. Field of the Invention

This invention relates to a preform used for making a plastic can body without requiring a cutting process and to a method of manufacturing a plastic can body by using such a preform.

2. Description of the Related Art

Fluids, such as beverages and oils, are conventionally contained in iron or aluminum cans. Along with the wide use of plastic bottles in place of glass bottles, there is a large demand for can-like plastic containers that can hold fluids.

Examples of such containers are disclosed in Japanese Patent Publication Sho-58 501991, and Japanese Patent Laid-Open Publications Sho-60 25734 and Sho-60 72720.

With these conventional containers, a preform is made by an injection molding process. The preform is then subjected to a biaxial stretch blow molding process to form a container having a flange around its top. The container is cut at an unnecessary portion of the flange by a cutter. The flange serves to hold a lid to the container by forming a double seam.

The blow-stretched flange is small in thickness but has sufficient mechanical strength due to the orientation of the plastic material. The flange also has properties to prevent permeation of gas into the container. Since such a blow-stretched flange is formed on part of the side wall of the blow-stretched container, it is necessary to cut an unnecessary portion of the flange by a cutter or the like. Consequently, the cut edge of the flange may be nicked. Even if the flange is formed by the biaxial stretch blow molding process to have the desired stretching orientation, extensive stresses will be applied to the cut edge. This can cause cracking of the cut edge and reduce the mechanical strength and durability when the flange is curled and double-seamed with the lid.

Forming the flange by the stretch blow molding process largely depends upon factors such as the selected material and the molding process. Therefore, it is very difficult to produce a flange having a uniform thickness. The flange may have different thicknesses along its circumferential direction.

In the foregoing methods, the cutting process not only complicates the container manufacturing process but also makes the flange less dimensionally uniform and durable.

SUMMARY OF THE INVENTION

It is therefore an object of the present invention to provide a preform having a flange formed by an injection molding process. The preform, except for the flange, is then biaxially blow-stretched to form a container. As a result of the above, the flange can be precisely dimensioned and have the mechanical durability necessary to be double-seamed with a lid. Further, the flange cutting process can be eliminated.

Another object of this invention is to provide a method of manufacturing a plastic can body by using such a preform.

According to an embodiment of this invention, there is provided an injection-molded cylindrical preform for making a plastic can body by the biaxial blow stretch molding process, comprising: a bottom wall and a side wall; a flange extending outwardly to a preset length from the side wall to be double-seamed with a lid, the flange having a thickness of one-third or less of the thickness of the side wall; and a shoulder for connecting the flange and the side wall, the shoulder being gradually thinned toward the flange.

With this arrangement, the flange is not subjected to the biaxial blow stretch molding process. Consequently, the flange keeps its original shape and dimension and can be durably double-seamed with the lid.

Further, since the molding material is charged into a narrow region of the thin flange through a wide region of the relatively thick side wall and the shoulder, the material becomes mechanically strong and durable due to its flow orientation. The term "flow orientation" refers to molecular orientation. When large molecules pass through a space under strong pressure, they are stretched in the direction of flow. The molecules are thus arranged in a regular repeating pattern, thus improving mechanical strength. The flange has a thickness of preferably one-third or less of the thickness of the side wall. The flange thickness is more preferably one-fifth or less of the thickness of the side wall. The side wall of the preform is sufficiently thick so as to be stretched vertically and horizontally to obtain a plastic can body having an optimum thickness as the final product.

The flange is preferably 0.3 mm to 0.7 mm thick. When the flange is thinner than the minimum limit, the molding material will not be sufficiently filled in the flange area. When the flange is thicker than the maximum limit, the material will not have the desired flow orientation. Consequently, the mechanical strength for double-seaming will be insufficient.

The portion of the shoulder near the flange is preferably as thick as the flange, since this portion has to be somewhat deformed to be double-seamed with the flange and the lid. This shoulder portion is preferably curved to enhance the double-seaming of the flange and the lid without cracks.

According to this invention, there is provided a method of manufacturing a plastic can body, comprising: injection-molding the cylindrical preform of this invention by using a neck mold for defining a flange and part of an outer wall of a shoulder, an injection cavity mold for defining the other outer wall of the preform, and a core mold for defining an inner wall of the preform; releasing the core mold and the cavity mold to carry the preform by the neck mold to a succeeding process; and biaxially stretch blow molding the preform to form a plastic can body.

After the injection-molded preform held by the neck mold is subjected to the biaxial stretch blow molding process, a plastic can body forming the final product is obtained without requiring any cutting process. Consequently, a period of one molding cycle is shortened. Further, since the preform is not cut, no plastic tips will enter into the interior of the can body. As a result, plastic can bodies are produced with a high throughput.

DETAILED DESCRIPTION OF PREFERRED EMBODIMENTS

This invention will be now described with reference to a preferred embodiment shown on the accompanying drawings.

Figure 1:
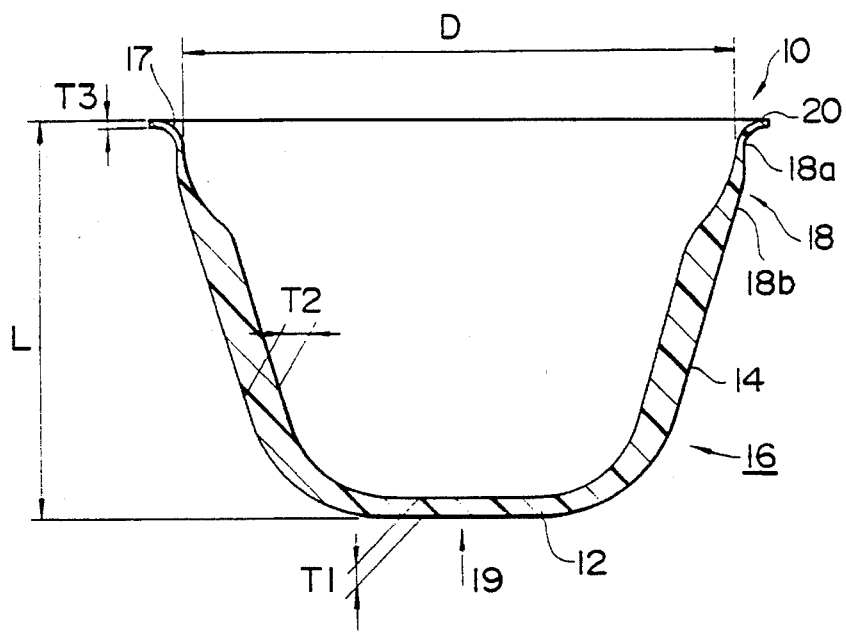
FIG. 1 shows a cross section of a preform according to one embodiment of this invention.

As shown in FIG. 1, a preform 10 made of polyethylene terephthalate (hereinafter called "PET") is formed as a cylindrical member 16 having a bottom wall 12, a side wall 14, a shoulder 18, and a flange 20 extending outwardly and radially from the side wall 14 via the shoulder 18. The flange 20 extends from the shoulder 18 via a portion 17 curved with a preset radius. The preform 10 is wide-mouthed, having a vertical length L and a diameter D at the top. The ratio between L and D is L/D<1. For instance, L=40.1 mm, and D=57.21 mm.

A thickness $T_1$ of the bottom wall 12 is smaller than a thickness $T_2$ of the side wall 14. For instance, $T_1$ is 2 mm while $T_2$ is 5 mm. A thickness $T_2$ of the side wall 14 may be variable for forming a thickness distribution in the axial direction.

The preform 10 has the smallest thickness at the flange 20, which will be double-seamed with the lid. Held by a neck mold (to be described later), the flange 20 is scarely, if at all, biaxially stretched during the biaxial blow stretch molding process. A thickness $T_3$ of the flange should be $T_3<T_2\times(1/5)$. In this embodiment, $T_3= 0.5$ mm, and preferably between 0.3 mm and 0.7 mm.

The portion having the largest thickness $T_2$ of the side wall 14 is gradually thinned to form the flange 20 of the smallest thickness $T_3$ via the shoulder 18. Similar to the flange 20, an upper region 18a of the shoulder 18 is scarcely, if at all, subjected to the biaxial stretch blow molding process since the portion 18a is also held by the neck mold. The upper portion 18a has a thickness which is substantially the same as the thickness $T_3$ of the flange 20. A portion 18b at the lower part of the shoulder 18 is gradually made thicker and is subjected to the biaxial stretch blow molding process.

The molding material PET is filled into an injection mold (to be described later) through a gate 19, thereby forming a preform 10. In this case, PET is injected into the narrow area for the flange 20 via the area for the side wall 14 and the shoulder 18 and is thereby oriented in the flowing direction. This results in the flange 20 having sufficient mechanical strength to receive the lid seamed therearound and prevent permeation of gas.

According to this embodiment, the injection-molded preform 10 undergoes a temperature control process during the biaxial blow stretch molding process. The blow biaxial stretch molding process uses a stretching rod and a fluid under pressure. The flange 20, held by the neck mold, can receive the lid to be seamed therearound without requiring any cutting process.

Figure 2:
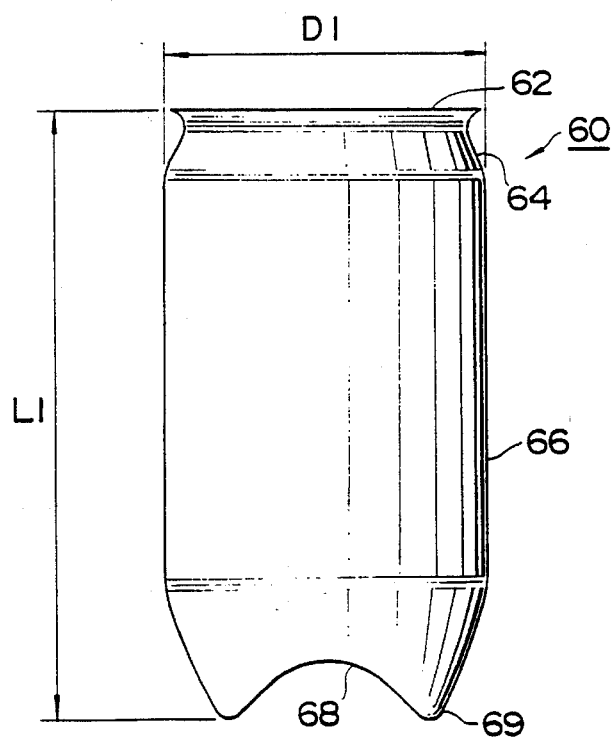
FIG. 2 shows a cross section of a can body made by the biaxial stretch blow molding process applied to the preform of FIG. 1.

FIG. 2 shows one example of a plastic can body 60 made by biaxially blow stretch molding the preform 10. The flange 62 of the can body 60 is as wide and thick as the flange 20 of the preform 10. The lower region of the shoulder 64, the side wall 66, and the bottom wall 68 of the can body 60 are biaxially stretched so that the can body 60 has a vertical length L of 123 mm and a largest diameter $D_1$ of 66.04 mm at the side wall 64. In this embodiment, the preform 10 is vertically stretched nearly three times while it is laterally stretched less than twice at maximum. This relatively low ratio of horizontal stretching differs from the prior art can body forming processes.

The can body 60 has a leg portion 69 that will be shaped according to the substance to be held therein. For example, the bottom of the can body 60 may be shaped like a bottom of a champagne bottle, as shown in FIG. 2.

The preform 10 will be made by the injection-molding process, undergoing a succeeding temperature control process and biaxial blow stretch molding, as shown in FIGS. 3A to 3D.

Figure 3A:
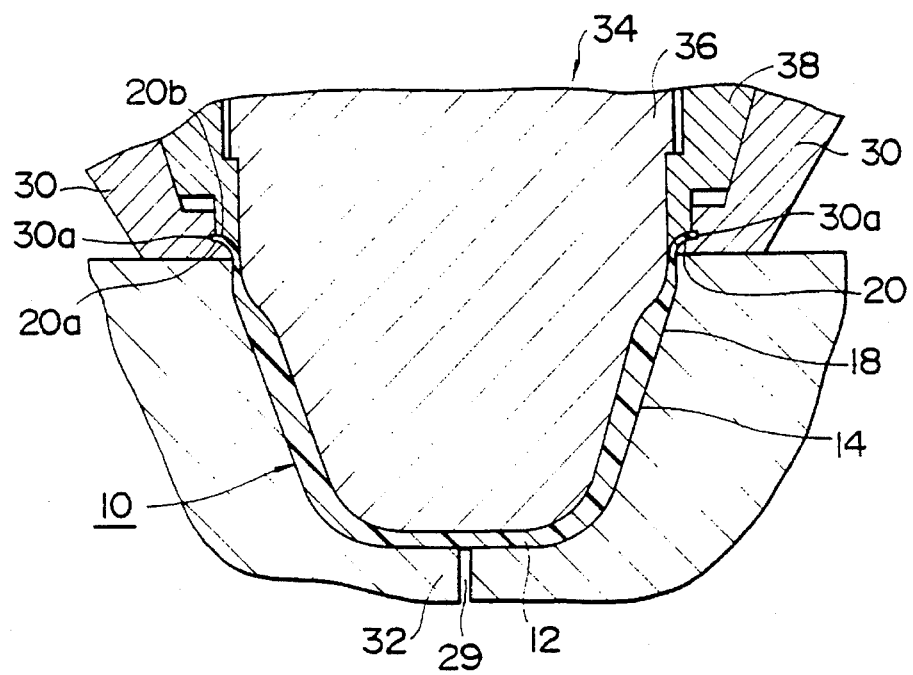
FIG. 3A to FIG. 3D show how to make the plastic can body by using the preform of FIG. 1.

FIG. 3A shows how to injection-mold the preform 10. An injection mold system comprises a neck mold 30 for defining the flange 20 and the outer wall of at least part of the shoulder 18, a cavity mold 32 for defining the other outer wall of the preform 10, and a core mold 34 for defining the inner wall of the preform 10.

The core mold 34 includes a first core mold 36 for defining an inner surfaces of the bottom wall 12 and the side wall 14, and a second core mold 38 for defining the inner surface of the upper peripheral edge of the preform 10.

As shown in FIG. 3A, the neck mold 30 includes mold halves that are openable to the right and left in the plane of FIG. 3A. The neck mold 30 also serves to carry the preform 10 to the succeeding process. After the biaxial blow molding process, the mold halves are opened to eject the can body 60, thereby completing one molding cycle. Then the neck mold 30 is returned to the preform injection-molding system. The molding cycle is repeated by circulating the neck mold 30. The neck mold 30 preferably has a groove 30a for defining the upper peripheral edge 20b of the flange 20 as well as for supporting the lower portion 20a of the flange 20, as shown in FIG. 3A. As a result, the preform 10 is prevented from being vertically displaced during transportation to the succeeding process.

The PET resin is filled through a gate 29 of the cavity mold 32 to injection-mold the preform 10. The PET resin is oriented while it is forced to flow to the flange 20. It is preferable to apply a relatively high pressure to the PET resin so that it flows sufficiently to the flange 20, which is farthest from the gate 29.

Figure 3B:
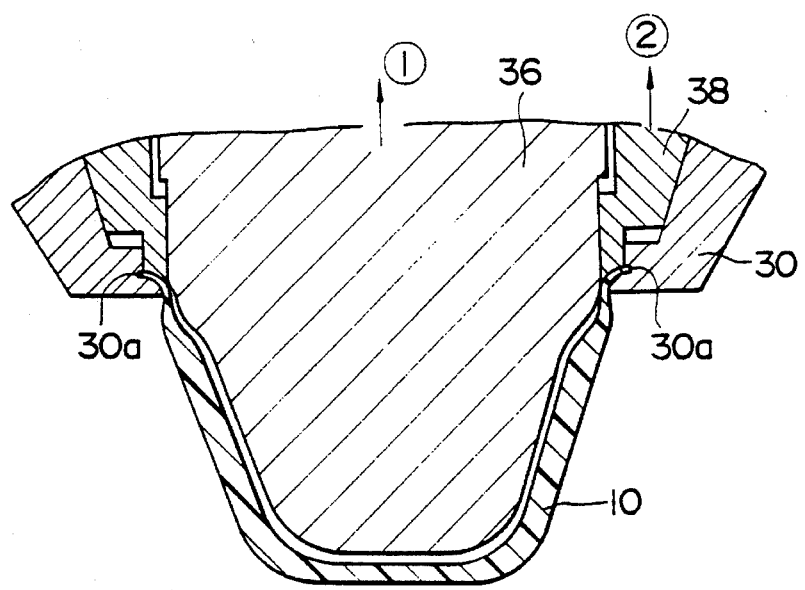

FIG. 3B shows how the injection mold is released. Both the core mold 34 and the cavity mold 32 should be released from the preform 10 before carrying the preform 10 to the succeeding process.

The core mold 34 is split into the first and second core molds 36, 38 for the following reason. If the core mold 34 is released as one unit, the preform 10 tends to move with the core mold 34 since it is hot immediately after molding the preform. This phenomenon occurs even though the flange 20 of the preform 10 is supported by the neck mold 30 at the groove 30a. The flange of the preform 10 will move out of the groove 30a as the preform 10 moves with the core mold 34. As a result, either the bottom of the preform 10 is deformed, or the preform 10 falls into the cavity mold 32 during movement.

To overcome these inconveniences, the first core mold 36 is released first. The preform 10, which is still supported at its upper wide region by the neck mold 30 and the second core mold 38, will not move with the first core mold 36. After at least the outer surface of the first core mold 36 is completely released from the inner surface of the preform 10, the second core mold 38 is released. Since the second core mold 38 contacts the preform at a narrow area compared with the first core mold 36, release of the second core mold 38 occurs so long as the groove 30a of the neck mold 30 can grip the preform 10. Thus, the preform 10 is prevented from being released from the neck mold 30.

Figure 3C:
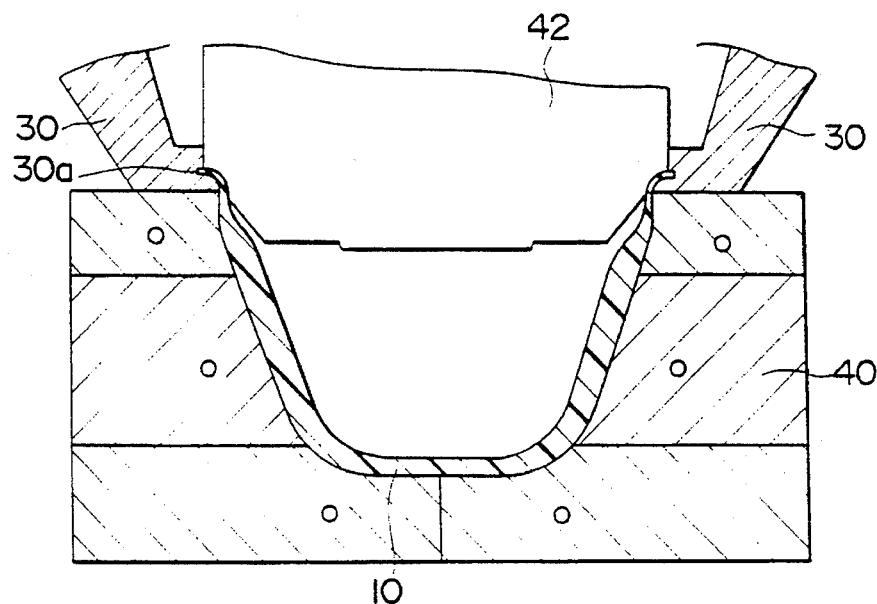

FIG. 3C shows a manner in which the preform 10 is temperature-controlled.

The preform 10 is carried to the temperature control process while being gripped by the neck mold 30, which is moved rotatably or linearly. In this embodiment, since the neck mold 30 has the groove 30a for holding the preform 10 vertically, the preform 10 will never fall from the neck mold 30.

The preform 10 is set in a temperature control pot 40, in which a temperature control core 42 is inserted near the mouth of the preform 10.

Figure 3D:
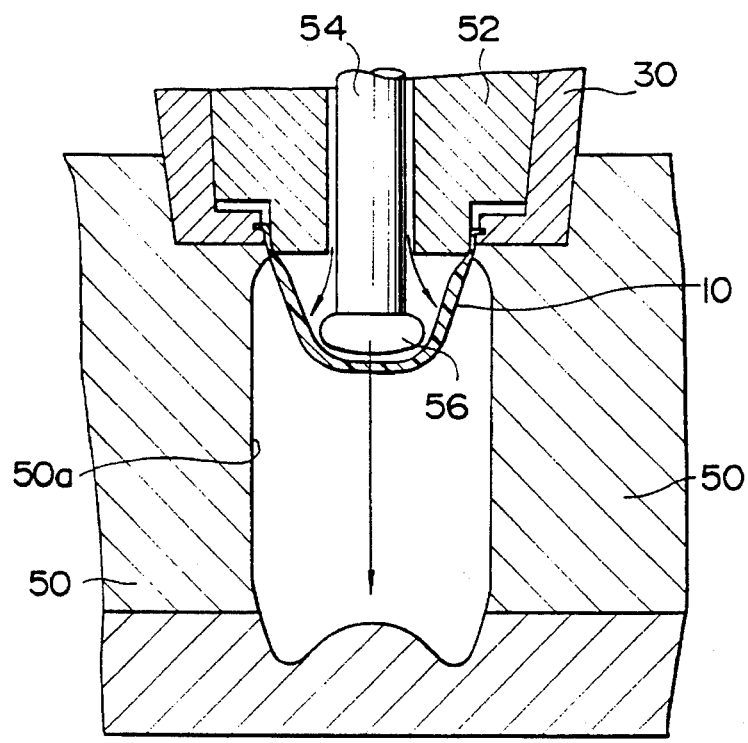

FIG. 3D shows the biaxial stretch blow molding process for the preform 10. The preform 10 is carried to this process by the neck mold 30.

The biaxial stretch blow molding unit comprises a blow cavity mold 50 having a cavity face 50a corresponding to the final shape of the can body. The preform 10, held by the neck mold 30, is placed in the blow cavity mold 50 having mold halves openable horizontally. Then, a blow core mold 52 is inserted into the blow cavity mold 50 through the mouth of the preform 10. The blow core mold 52 supports a vertically movable stretching rod 54. To biaxially blow-stretch the preform 10 to obtain the can body 60, a top 56 of the stretching rod 54 is contacted with the inner surface of the bottom wall 12 of the preform 10. Then, the stretching rod 54 is downwardly moved to stretch the preform 10 vertically. Simultaneously with or after vertical stretching, fluid, such as air, is blown into the preform 10 to stretch it horizontally and radially. The preform 10 made of PET is biaxially oriented to form the can body 60 in the final shape along the cavity face 50a.

In the above process, the flange 20, held by the neck mold 30, is not biaxially stretched. The flange 20 is designed to have the thickness $T_3$. In addition, the PET material is oriented while it flows through the molds, thereby making the flange 20 strong enough to receive a lid double-seamed therearound.

A label is then attached to the can body 60. The can body is filled with a substance and sealed by a lid by the double seaming method, as disclosed on page 41, "Metal Containers for Food Canning, and Double Seaming," published by Japan Canned Food Association, Inc. Specifically, the curled portion of the lid and the flange 62 of the can body 60 are fitted and seamed by a first seaming roll in a first step, and then the fitted and seamed portion is pressed by a second seaming roll in a second step. A sealing compound is filled in a gap between the seamed portions to seal the can body.

Figure 4:
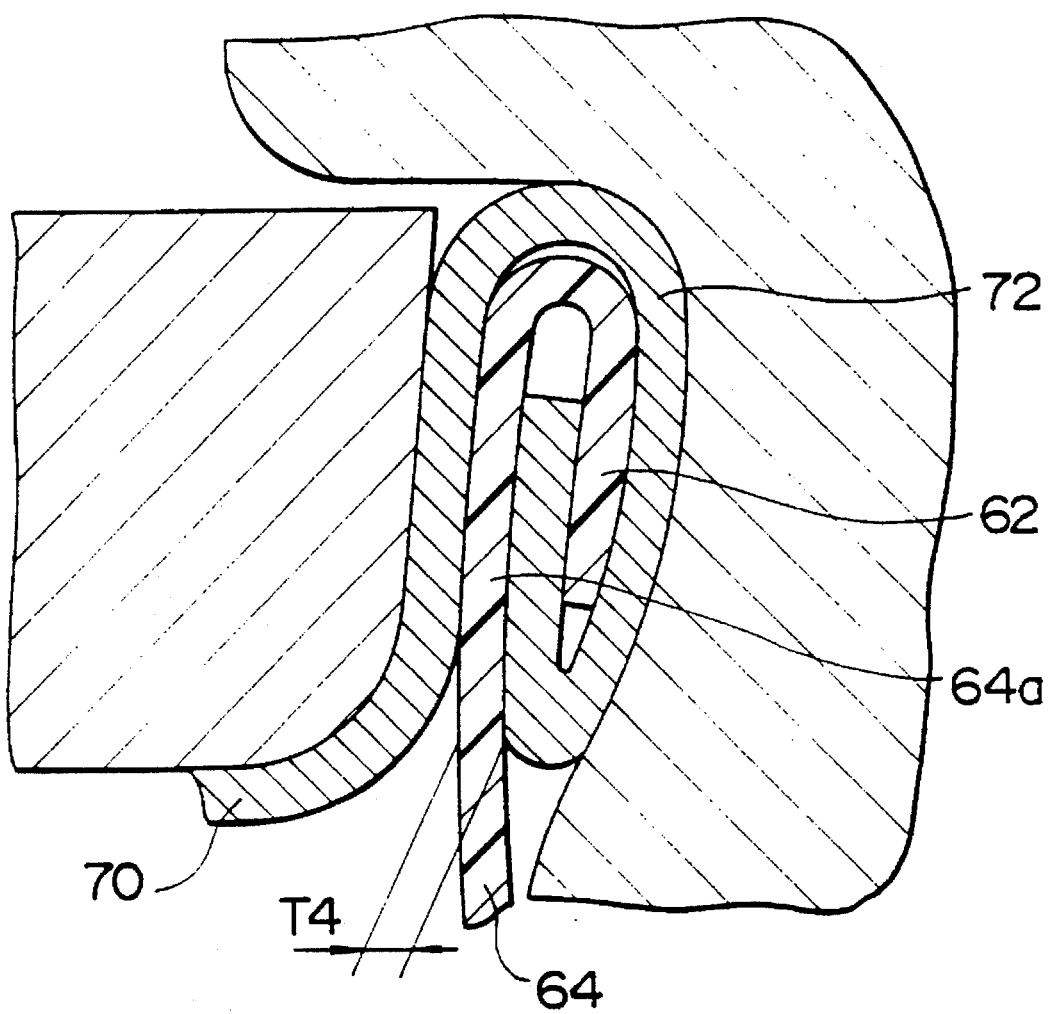
FIG. 4 shows how a flange of the plastic can body is double-seamed with a lid.

FIG. 4 shows how the curled portion 72 of the lid 70, the flange 62 and upper portion 64a of shoulder are double-seamed. For this purpose, the flange 62 is required to have a shape and dimension to fit the lid. Since the preform 10 is injection-molded, the flange can be formed very precisely to improve the quality of the double seam over the conventional cut-flange process. The thickness $T_4$ of the upper portion of the shoulder 64 is preferably equal to the thickness $T_3$ of the flange 62 so that the curled portion 72 of the lid can be deformed to seam the flange 62 completely. The portion 64a of the shoulder 64 corresponds to the upper portion 18a of the shoulder 18 of the preform 10. The thickness of the upper portions 64a and 18a are controlled during injection molding of the preform 10. Since the portion 64a, i.e., the portion 18a of the preform 10, is sandwiched between the neck mold 30 and the blow core mold 54, this portion is not biaxially stretched in the biaxial blow stretch molding process. The upper portion 64a, which has to be as thick as the flange 62, can be effectively controlled to the preset thickness during the injection molding process.

It should be noted that this invention is not limited to the foregoing embodiment but can be modified as desired within the scope of the subject matter thereof.

The dimensions of the preform are given as an example, and may be determined depending upon the final size of the can body and the size of the lid to be double-seamed. As for the resin material, it may be selected based on the substance to be filled in the can body. However, the thickness $T_3$ of the flange and the maximum thickness $T_2$ of the side wall 20 of the preform 10 should be kept in the range defined in this invention, since the flange 20 of the preform 10 is not stretched during the biaxial stretch blow molding process.

According to this invention, the flange, which is not stretched during the biaxial stretch blow molding process, is the thinnest portion of the preform while the side wall of the preform is several times thicker than the flange, so that a preform having a large mouth is blow-stretched to obtain a desired can body including a flange having a desired dimension without requiring any cutting process.

After injection molding, the preform proceeds with a cycle of the temperature control process and the biaxial stretch blow molding process while supported by the neck mold, thereby extensively speeding up the overall molding cycle of the plastic can body.

What is claimed is:

1. A method of manufacturing a cylindrical plastic can body, comprising:

(a) injection-molding plastic to form a cylindrical plastic preform including:

forming a bottom and a side wall, forming a molecularly oriented flange extending outwardly to a preset length from said side wall and having a thickness of one-third or less of the largest thickness of said side wall, said flange thickness being in the range from 0.3 mm to 0.7 mm so that said plastic molecularly orients as the plastic is injected to form said flange and the molecular orientation is in an amount sufficient for double-seaming said flange with a lid, forming a curved shoulder having a preset radius for connecting said flange and said side wall; and (b) biaxially stretch blow molding said cylindrical plastic preform to form a plastic can body.

2. A method according to claim 1, wherein said injection-molding step includes using a neck mold for defining said flange and an outer wall of an upper part of said shoulder, wherein the method further comprises the step of carrying said preform by said neck mold to a station at which said biaxially stretch blow molding step is preformed.

3. A method according to claim 2, wherein said injection-molding step includes using an injection cavity mold and a core mold.

4. A method according to claim 2, including providing said neck mold with a circular groove for defining an upper part and a lower part of a peripheral edge of said flange.

5. A method according to claim 1, wherein said shoulder forming step includes forming an upper portion of said shoulder with a thickness substantially equal to the thickness of the flange.

6. A method according to claim 1, wherein said shoulder forming step includes forming said shoulder with a tapered thickness.

7. A method of manufacturing a cylindrical plastic can body, comprising:

a) injection-molding plastic to form a cylindrical plastic preform including:

forming a bottom and a side wall, forming a molecularly oriented flange extending outwardly to a preset length from said side wall and having a thickness of one-third or less of the largest thickness of said side wall, said flange having a thickness in the range from 0.3 mm to 0.7 mm so that said plastic molecularly orients as the plastic is injected to form said flange and the molecular orientation is in an amount sufficient for double-seaming said flange with a lid, forming a shoulder for connecting said flange and said side wall, said shoulder having a gradually reduced thickness toward an upper part of said shoulder; and b) biaxially stretch blow molding said cylindrical plastic preform to form a plastic can body.

8. A method according to claim 7, wherein said injection-molding step includes using a neck mold for defining said flange and an outer wall of said upper part of said shoulder, wherein the method further comprises the step of carrying said preform by said neck mold to a station at which said biaxially stretch blow molding step is preformed.

9. A method according to claim 8, including providing said neck mold with a circular groove for defining an upper part and a lower part of a peripheral edge of said flange.

10. A method of manufacturing a cylindrical plastic can body, comprising:

(a) injection-molding a cylindrical plastic preform including:

forming a bottom and a side wall, forming a flange extending outwardly to a preset length from said side wall, forming a curved shoulder having a preset radius for connecting said flange and said side wall; and (b) biaxially stretch blow molding said cylindrical plastic preform to form a plastic can body, wherein said injection molding step includes using a first core mold for defining a first area of an inner wall of said preform and using a second core mold for defining a second area of said inner wall proximate to said first area, wherein said first area is larger than said second area, and the injection molding step further includes releasing said second core mold after releasing said first core mold but prior to changing the shape of the preform.

* * * * *